(No Model.)  5 Sheets—Sheet 1.

W. C. DOUGHERTY.
DEVICE FOR HOLDING HORSES WHILE BEING SHOD.

No. 304,916.  Patented Sept. 9, 1884.

Witnesses:
J. W. Garner
A. S. Pattison

Inventor:
W. C. Dougherty
per
F. A. Lehmann,
Atty (No Model.)

W. C. DOUGHERTY.
DEVICE FOR HOLDING HORSES WHILE BEING SHOD.

No. 304,916. Patented Sept. 9, 1884.

(No Model.) 5 Sheets—Sheet 3.
W. C. DOUGHERTY.
DEVICE FOR HOLDING HORSES WHILE BEING SHOD.
No. 304,916. Patented Sept. 9, 1884.
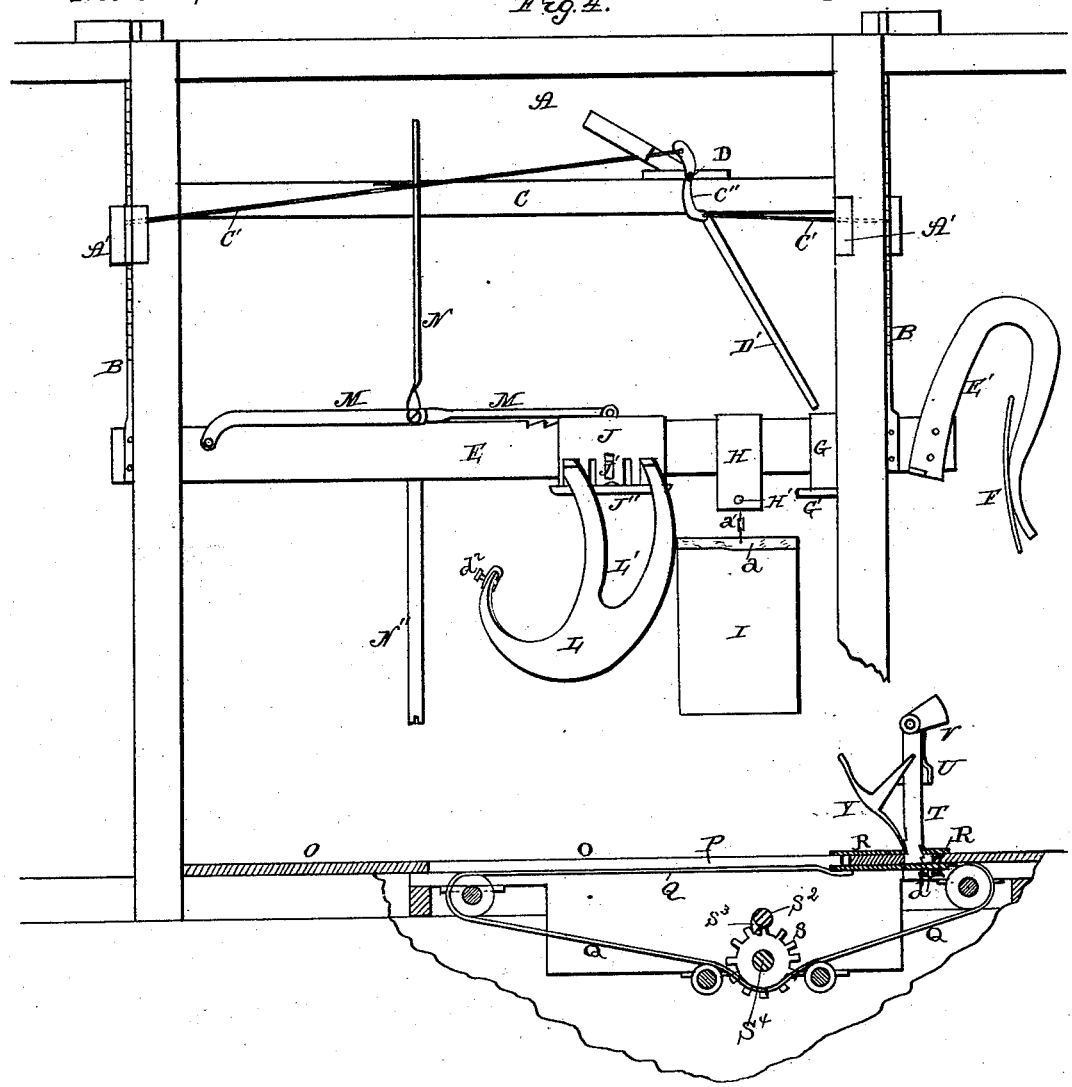

(No Model.) 5 Sheets—Sheet 4.
W. C. DOUGHERTY.
DEVICE FOR HOLDING HORSES WHILE BEING SHOD.
No. 304,916. Patented Sept. 9, 1884.
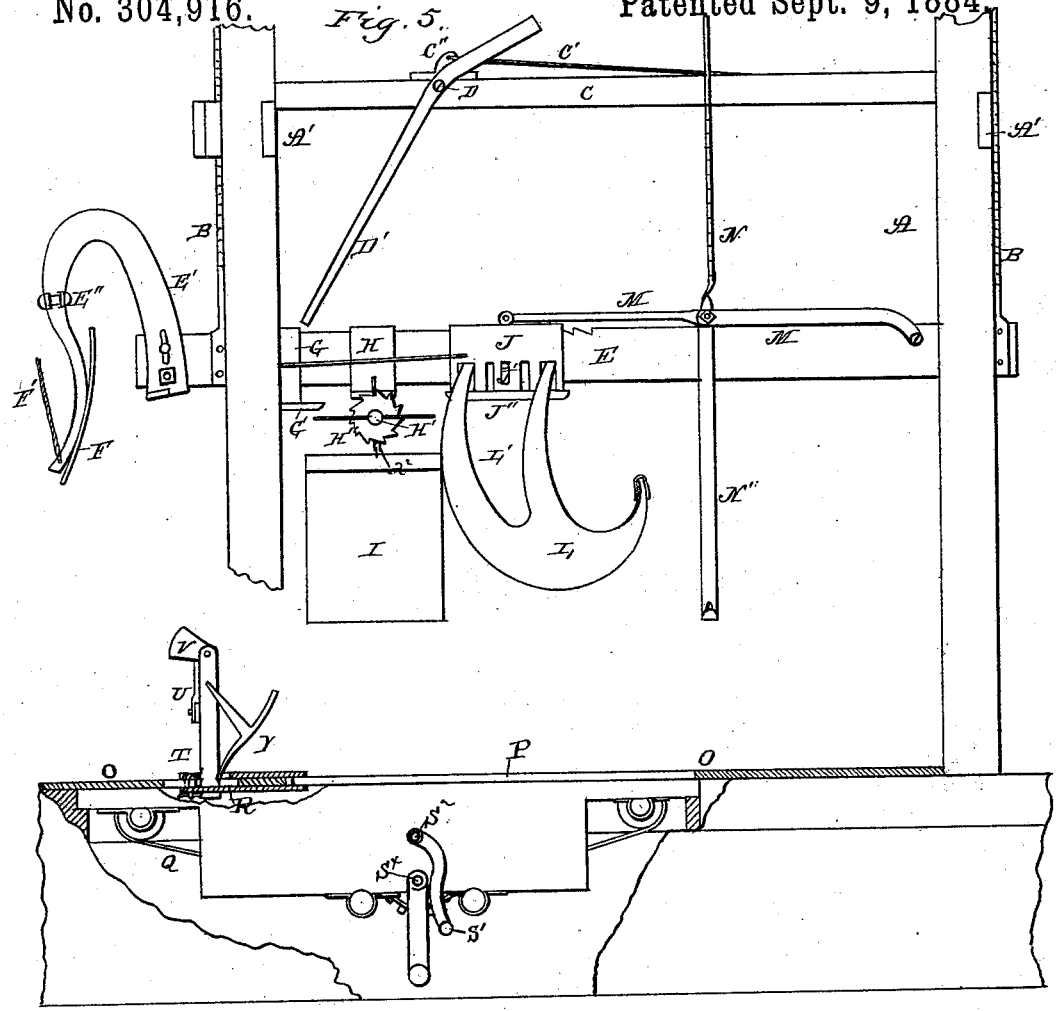
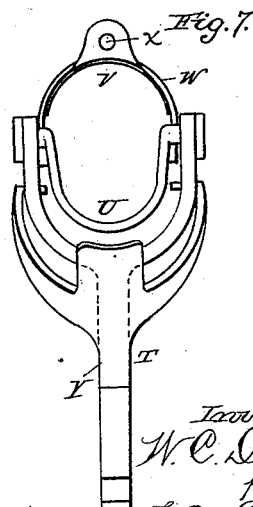
Witnesses:
J. W. Garner
A. S. Pattison
Inventor:
W. C. Dougherty
per
J. A. Lehmann, atty (No Model.)

W. C. DOUGHERTY.

DEVICE FOR HOLDING HORSES WHILE BEING SHOD.

No. 304,916.

Patented Sept. 9, 1884.

5 Sheets—Sheet 5.

UNITED STATES PATENT OFFICE.

WILLIAM CONLY DOUGHERTY, OF CLYDE, MINNESOTA.

DEVICE FOR HOLDING HORSES WHILE BEING SHOD.

SPECIFICATION forming part of Letters Patent No. 304,916, dated September 9, 1884.

Application filed September 4, 1883. (No model.)

*To all whom it may concern:*

Be it known that I, WILLIAM C. DOUGH-ERTY, of Clyde, in the county of Winona and State of Minnesota, have invented certain new and useful Improvements in Devices for Holding Horses or other Animals to be Shod or Treated Medically or Surgically; and I do hereby declare the following to be a full, clear, and exact description of the invention, such as will enable others skilled in the art to which it pertains to make and use it, reference being had to the accompanying drawings, which form part of this specification.

My invention relates to an improvement in devices for securing animals in a standing position to be surgically or medically treated or shod; and it consists, first, in the combination of a vertically-moving beam which is provided with a suitable collar, pads for the back, rigid adjustable breeching, and a band or belt of any suitable width for passing under the body of the animal; second, in the combination of a vertically-adjustable beam with suitable devices for securing the animal in a standing position while being operated upon, and suitable counter-weights, which are attached either to supporting-rods attached to the beam or directly to the beam itself; third, in the combination of a slotted support, frame, or platform, upon which the animal stands while being operated upon, with a suitable sliding foot-rest, and devices for adjusting it back and forth and holding it in any desired position; fourth, in the combination and arrangement of parts, which will be more fully described hereinafter.

Figure 1:
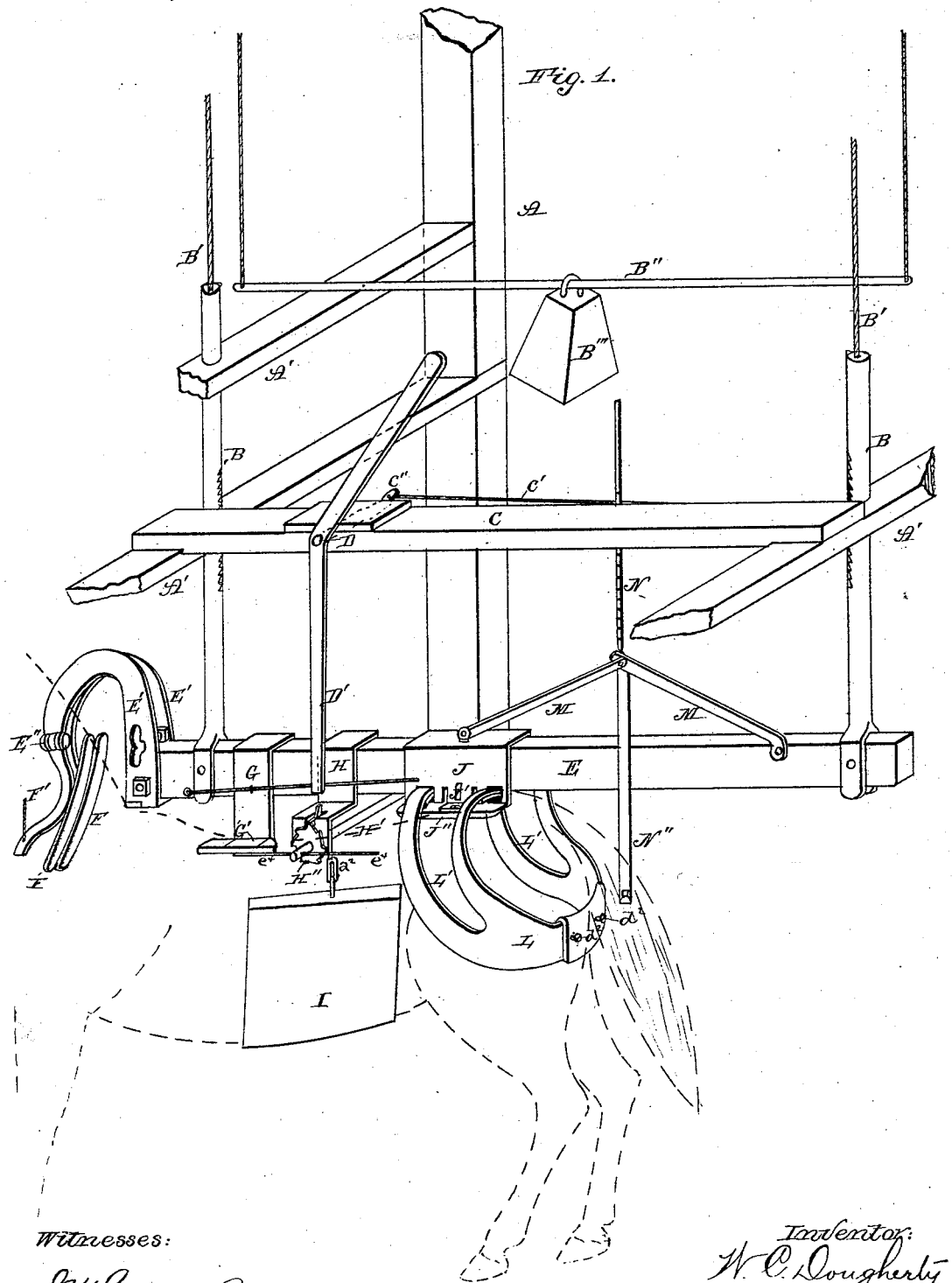
Figure 2:
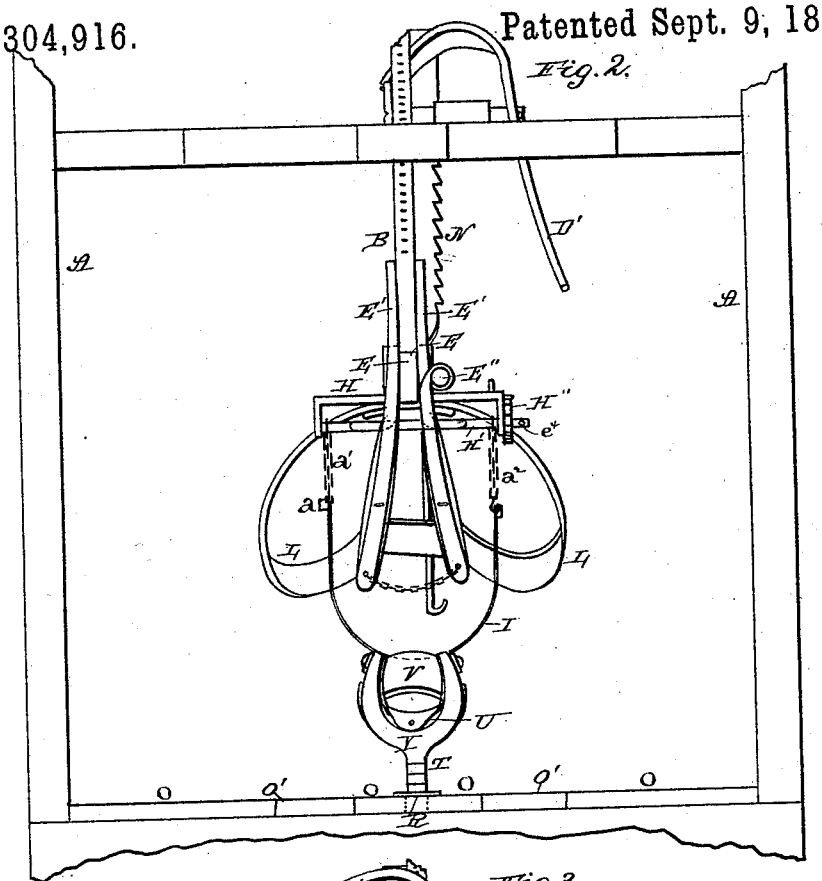
Figure 3:
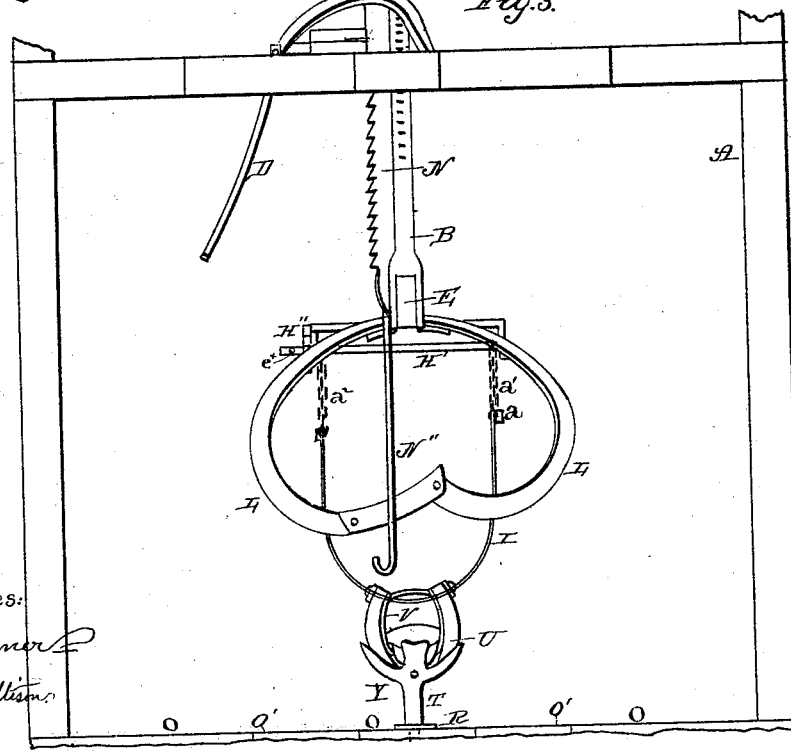
Figure 9:
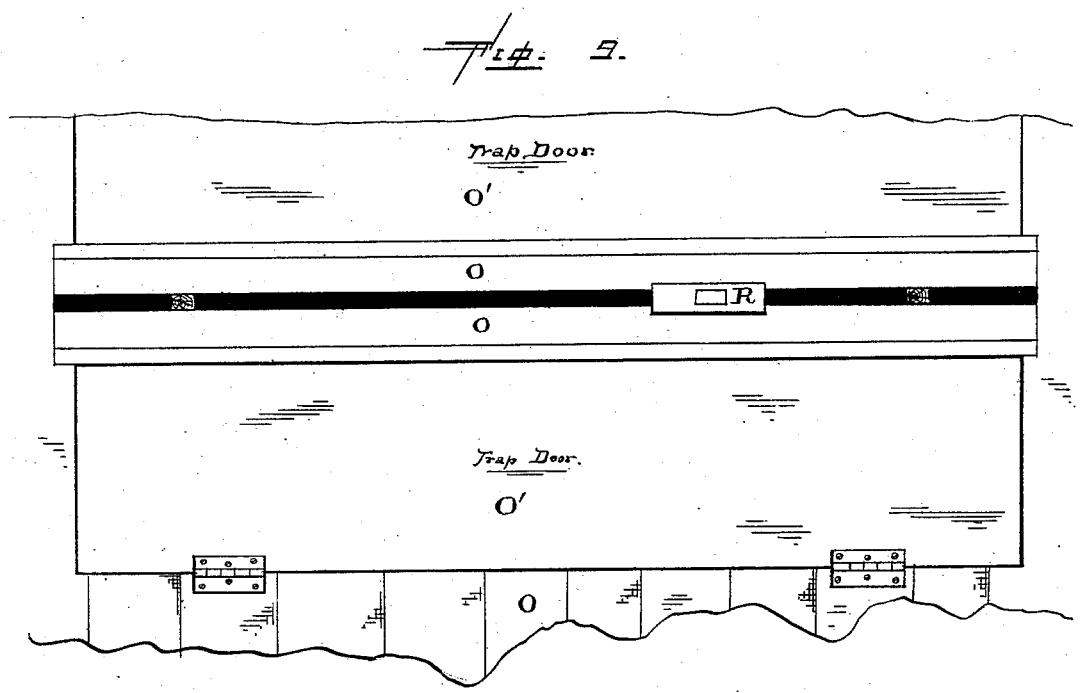

Figure 1 is a perspective view of an apparatus embodying my invention, looking from the rear. Fig. 2 is a front elevation. Fig. 3 is a rear view. Figs. 4 and 5 are side elevations taken from opposite sides. Figs. 6, 7, are detail views. Fig. 8 is a transverse section of the platform, taken at right angles to Fig. 4 through the platform, and mechanism for moving the foot-rest. Fig. 9 is a plan view of the platform by itself.

A represents the frame-work of a shop of any suitable or convenient construction. I do not limit myself in any respect to the framework to which my apparatus is to be applied, for this may be varied in many respects. In the upper part of each end or the side of the shop-frame are arranged two beams or bearings, A', up through which the two vertically-adjustable rods B are passed. To the lower ends of these rods B is attached, in any suitable manner, the beam E, and to the upper ends of the rods are secured the cords, wires, or chains B', which pass up through suitable pulleys arranged in the upper part of the shop, and which have their lower ends connected together by a cross-rod, B", or by any other suitable device that may be preferred. Upon this rod will be placed a suitable counter-weight, B''', which will be just sufficient to counterbalance the beam E, and thus cause the beam to be readily adjusted up and down according to the height of the animal that is to be operated upon. In case the rods B are not used, the cords B' may be attached directly to the ends of the beam E. The only difference in this case will be that the beam E will not be held so rigidly in position, but its operation is otherwise just the same. In order to hold this beam E rigidly in place, after it has once been adjusted to the desired height, the two locking-rods C' are used, and the ends of these rods pass through the beams A', so as to catch in suitable holes or ratchets which are formed in the sides of the rods B. The inner ends of these rods C' are attached to opposite ends of the arms C", which are secured to one end of a short shaft, D, which is journaled upon the cross-bar C, which extends from one cross-beam A' to the other. Upon the opposite end of the shaft D from the arms C" is secured the weighted lever D', which causes the rods C' to lock the rods B in position. At any time that it is desired to adjust the beam vertically it is only necessary to move the lever D', so as to disengage the rods C', and then the beam E may be raised and lowered at will. The beam E extends directly over the place where the animal is stood to be operated upon. Secured to the front end of this beam E are the two curved metalic bars or rods E', which are attached to opposite sides of the beam E by means of a clamping-bolt, which passes directly through the beam, and by a suitable set-screw. The lower ends of these curved rods E' pass each other on the under side of the beam, and, being loosely connected to the beam by means of the bolt and set-screw, they can be readily adjusted laterally, according to the size of the animal to be operated upon. To the lower front ends of these two bars E' are secured the pads F, which bear against the neck and shoulders of the animal for the purpose of preventing it from moving forward. One of the bars E' is made in two parts, and these two parts are pivoted together at E'', so that the pad which is secured to the pivoted portion can readily be raised outward and upward for the purpose of allowing it to be adjusted to the animal. To this pivoted portion there will be attached a weighted cord, F', which will pass up through a pulley located at any suitable point, and thus hold the pad always in a raised position except when in use. These pads, or the lower ends of the bars E', will be provided with a suitable fastening strap, band, or any other suitable device that will serve to connect the two parts together like hames. As above stated, these pads bear against the shoulders and neck of the animal, and prevent the animal from moving either forward or sidewise.

Upon the beam E, back of the bars E', is secured a suitable sliding yoke, G, to the lower ends of which are loosely attached suitable pads, G', which bear upon the back of the animal, for the purpose of preventing it from rearing or rising upward. A very light pressure of these pads upon the back is sufficient.

Back of the sliding yoke G is placed a second sliding yoke, H, which has its ends turned outward and downward, as shown, so as to receive the shaft H' between them, which shaft is made to revolve, for the purpose of winding or unwinding the chains, by means of the rod or handle $e^1$. Upon the inner end of this shaft H' will be secured a suitable ratchet, H'', and upon the support H will be pivoted a suitable pawl to engage with the ratchet-wheel, and thus hold the ratchet in any position into which it may be adjusted. Secured to or passed through one end of this shaft H' is a suitable cord or chain, $a'$, which has its lower end attached to a suitable stretcher or fastening, $a$, which fastening or stretcher is secured to one end of the broad band, belt, or apron I, which passes under the body of the animal for the purpose of holding it in such a position that it cannot lie down or make any similar movement. To the opposite end of the shaft H' is attached a second cord, wire, or chain, $a^2$, which is provided with a hook at its lower end, and which is intended to engage with a stretcher upon the loose end of the band or belt. After this band or belt I has been passed under the body of the animal, the free end of the band or belt is attached to the second cord, wire, or chain, and then the shaft H' is revolved in such a manner as to cause the cords, wires, or chains to be wrapped upon the shaft until the band or belt bears against the stomach of the animal with sufficient force to prevent the animal from making any downward movement.

Behind the yoke H is another sliding yoke, J, adapted to move back and forth on the beam E, and which has downwardly-projecting slotted arms or portions J', to the lower ends of which are secured the self-adjusting pads J'', which bear upon the animal's back and prevent it from making any movement toward kicking or backing. Transverse slots are made through this yoke, and through these slots are passed the forked ends L' of the adjustable rigid breeching L. The curvature of this breeching is determined by means of a telescoping section at that point where the lower rear ends of the parts L meet, and the breeching is thus adjusted to animals of various sizes. These two parts of the breeching may be held in any desired relation to each other by means of set-screws $d^2$, or any other similar fastening devices. For the purpose of holding this yoke J in any position in which it may be adjusted, the two levers M are used. One of these levers has its outer end pivoted to the top of the yoke, while the second lever M has its outer end connected directly to the beam E. The inner ends of these levers are pivoted together, and upon the same pivotal bolt is placed the ratchet-bar N, which is continued down into a handle, N'', and by means of which the levers are moved. When this handle N'' is forced upward, the ends of the levers M are also raised upward, and the yoke J is drawn backward upon the beam E. When the handle N'' is drawn downward, the yoke J is forced forward, so as to bear against the hind quarters of the animal with any desired degree of force.

From the above description it will be seen that the animal is held at its neck and shoulders by means of pads; that pads bear upon its back and hind quarters; that the animal is supported from underneath by means of the belt or apron, and is prevented from any backward movement or kicking by means of the breeching L. Being thus held, it is impossible for the animal to move, and the smith or surgeon can work around or operate upon it with perfect safety.

The animal is placed, when it is to be operated upon, upon a slotted platform, bearing, or support, O, of any suitable construction. I do not limit myself to the construction of this platform, for it may be constructed of any suitable material, and in many different ways. Upon each side of this platform will be made a suitable pit, which will be covered over by a board, O', and into which the blacksmith or surgeon will go while at work in treating the feet for any purposes. These pits will be of such a depth as will enable the smith or surgeon to operate upon the feet with ease and without the necessity of having to stoop or bend over. The slot P in the platform, bearing, or support will be of just a sufficient width to enable a sliding carriage, R, to be moved back and forth from the front to the hind feet. To opposite ends of this carriage, which has a suitable opening in its top to receive the supporting-standard, are secured the opposite ends of the chain, rope, or band Q, by means of which the carriage R is moved back and forth. This band passes over suitable guiding-pulleys at the end and over suitable guiding-pulleys, which hold it in contact with a sprocket-wheel or other devices, S, for moving the chain. This sprocket-wheel is placed upon a suitable shaft, $S^4$, provided with a handle or crank, and above the sprocket-wheel is placed a suitable pawl, catch, or other device, $S^3$, for engaging with the wheel, thus locking the wheel and chain, and through them the carriage R, in any desired position. The pawl or catch $S^3$ is secured to the shaft $S^2$, which has its outer end provided with a weighted handle, S'. When the shaft $S^2$ is left free to turn, this weighted handle drops downward and forces the pawl or catch $S^3$ in contact with the wheel. By turning the shaft connected to the sprocket-wheel in one direction the carriage is moved forward toward the front feet, and by reversing the motion of the shaft the carriage is moved backward toward the rear feet.

The carriage R consists of a suitable perforated plate or frame, which is secured to the belt or chain Q, as shown in Fig. 8, and which carriage slides along the slot P as the belt or chain is moved by the sprocket-wheel. All of the operating parts used in moving the carriage R back and forth are supported in suitable beams, or a frame-work of any kind, which is formed under or forms a part of the platform.

Passing down through the opening in the carriage R is a suitable supporting-standard, T, which, after it has been placed in position upon the carriage, is locked in place by means of a latch, bolt, or any other fastening device, d, which will answer for that purpose. An ordinary sliding bolt is here shown; but I do not limit myself to this device alone. The upper end of this supporting-standard T is pronged, as shown, and through these pronged ends are passed the trunnions or bearings of the lower half of the anklet or support U, into which the animal's leg is placed. The upper half of this anklet consists of a curved or semi-circular piece, V, which has notches cut in its lower end, so as to catch over the trunnions or bearings of the part U. In order to prevent this part V from becoming too readily detached from the part U, there is pivoted upon it a suitable latch or locking device, W, to which is connected the spring X. The lower ends of this device W extend downward far enough to close the front sides of the notches in the part V, and thus prevent this part V from becoming detached from the trunnions or bearings of the part U until the ends of the part U are forced backward far enough to allow the trunnions or bearings to slip out.

Loosely attached to the supporting-standard T is the foot-rest Y. This rest Y will preferably be made of steel, so that its ends can be snapped into any pair of holes which are made through the sides of the upper portion of the standard T. By having a series of holes through the standard T this rest can be adjusted vertically, so as to accommodate itself to the foot or the device in which it is desired to hold the foot while being operated upon. This foot-rest is adapted to be applied to either side of the standard T, according to the position of the foot which is to be held. Upon the two edges of the standard will be made suitable notches or ratchets, in which the lower end of this rest will be held. This rest may be used for supporting the toe of the foot, or may be made to support the heel or any other portion, as may be desired. Were it not for this foot-support or brace the foot would hang pendulous from the anklet, and require the use of one of the workman's hands to steady it. I do not limit myself to any particular construction of this brace or support, for it may be made in different shapes. When the clinching of the nails in the shoe is being done, this brace is swung to the opposite side of the foot-rest, and the end turned upward to rest just behind the toe-calk, and lifted up tight to hold and steady the foot.

Having thus described my invention, I claim—

1. In a device for holding animals to be shod or otherwise treated, the combination of the beam E, provided with suitable devices for holding the animal in position, supporting rods or cords, and a counterpoise, the beam being adapted to be lowered directly over the horse's back, so that the holding device attached thereto can be at once rigidly adjusted to the horse, so as to hold him in position, substantially as described.

2. In a device for holding animals, the beam E, in combination with a breeching and means for longitudinally and laterally adjusting the same, substantially as described.

3. In a device for securing animals, the combination of the yoke J, adjustable upon the beam E, and provided with pads J'', with a sectional breeching, the ends of which pass through slots in the yoke J, substantially as set forth.

4. In a device for securing animals, the yoke J, carrying the rigid breeching L and sliding on the beam E, in combination with the levers M and the ratchet-bar N, and a suitable plate or device for engaging with the bar, substantially as specified.

5. In a device for holding animals, the beam E and a yoke, H, in combination with the shaft H', carrying the ratchet, and a means for turning the ratchet, suitable cords, chains, or wires, and the band or belt for passing under the horse's body, substantially as shown.

6. In a device for holding animals, the combination of the beam E with the bars E' and the pads F, attached thereto, one of the pads being adapted to be raised upward and outward, substantially as described.

7. The combination of the beam E, the vertically-adjustable rods B, fastening-rods C', an operating-shaft, and a lever connected thereto, substantially as set forth.

8. In combination with a suitable mechanism for holding animals, a platform or support, O, provided with a slot, with a carriage and a foot-support, and a mechanism for moving the carriage back and forth, substantially as specified.

9. In a device for holding animals, a sliding carriage, R, adapted to move in the slot P, in combination with the drive-chain, the sprocket-wheel provided with a crank, and a device for locking the sprocket-wheel in position, substantially as shown.

10. In a device for securing animals, the combination of the sliding carriage R, provided with a socket and latch, d, with the removable foot-rest T, carrying an anklet for the support of the animal's foot, substantially as described.

11. In a device for holding animals, the combination of the movable carriage, the standard T, the anklet U V, and the spring-actuated latch or locking device W', substantially as specified.

12. The combination, in an animal-holding device, of the standard T, the anklet U V, and a foot rest or brace, substantially as shown and described.

In testimony whereof I affix my signature in presence of two witnesses.

WILLIAM CONLY DOUGHERTY.

Witnesses:
H. N. GAGE,
FRED SMITH.